United States Patent
Qi et al.

(10) Patent No.: US 10,316,384 B2
(45) Date of Patent: Jun. 11, 2019

(54) HOLLOW FORGING PROCESS FOR MAIN SHAFT OF LARGE WIND TURBINE GENERATOR

(71) Applicant: Jiangyin Zenkung Forging Co., Ltd., Wuxi, Jiangsu (CN)

(72) Inventors: Zhenhua Qi, Jiangsu (CN); Shengyi Ma, Jiangsu (CN); Shengxiang Liu, Anhui (CN); Zhenwei Yan, Jiangsu (CN)

(73) Assignee: Jiangyin Zenkung Forging Co., Ltd., Wuxi (CN)

( * ) Notice: Subject to any disclaimer, the term of this patent is extended or adjusted under 35 U.S.C. 154(b) by 397 days.

(21) Appl. No.: 15/402,219

(22) Filed: Jan. 9, 2017

(65) Prior Publication Data
US 2018/0057904 A1    Mar. 1, 2018

(30) Foreign Application Priority Data
Aug. 26, 2016 (CN) .......................... 2016 1 0726344

(51) Int. Cl.
| | | |
|---|---|---|
| *C21D 9/08* | (2006.01) |
| *C22C 38/44* | (2006.01) |
| *B22D 7/00* | (2006.01) |
| *B22D 29/00* | (2006.01) |
| *C22C 38/22* | (2006.01) |
| *C22C 38/04* | (2006.01) |
| *C21D 8/10* | (2006.01) |
| *B21J 5/02* | (2006.01) |
| *F03D 80/80* | (2016.01) |
| *B21J 5/08* | (2006.01) |
| *B21J 5/10* | (2006.01) |
| *B21K 1/06* | (2006.01) |
| *B21K 1/10* | (2006.01) |
| *F03D 15/00* | (2016.01) |

(52) U.S. Cl.
CPC .................. *C21D 9/08* (2013.01); *B21J 5/02* (2013.01); *B21J 5/022* (2013.01); *B21J 5/08* (2013.01); *B21J 5/10* (2013.01); *B21K 1/063* (2013.01); *B21K 1/10* (2013.01); *B22D 7/00* (2013.01); *B22D 29/00* (2013.01); *C21D 8/105* (2013.01); *C22C 38/04* (2013.01); *C22C 38/22* (2013.01); *C22C 38/44* (2013.01); *F03D 15/00* (2016.05); *F03D 80/88* (2016.05); *F05B 2230/10* (2013.01); *F05B 2230/25* (2013.01); *F05B 2240/61* (2013.01); *Y02E 10/72* (2013.01); *Y02P 70/523* (2015.11)

(58) Field of Classification Search
None
See application file for complete search history.

*Primary Examiner* — Jenny R Wu

(57) ABSTRACT

A hollow forging process for main shaft of large wind turbine generator, wherein, comprising the following steps as: the first step of cutting off the dead head and the bottom of an ingot; the second step of upsetting and punching a hole; the third step of drawing-out; and the fourth step of local upsetting, drawing-out and shaping-up. In the fourth step, the forged piece is shaped up by local upsetting and drawing-out through a turnplate. The hollow forging process for main shaft created by the invention can save the costs for enterprise to purchase large equipment and makes it possible to forge the main shaft of large wind turbine generator with a free forging oil press with a smaller size.

9 Claims, 4 Drawing Sheets

HOLLOW FORGING PROCESS FOR MAIN SHAFT OF LARGE WIND TURBINE GENERATOR

CROSS-REFERENCE TO RELATED APPLICATIONS

The present application claims the benefit of Chinese Patent Application No. 201610726344.X filed on Aug. 26, 2016, the contents of which are hereby incorporated by reference.

TECHNICAL FIELD

The Invention relates to hollow forging process for main shaft of wind turbine generator, and particularly to a hollow forging process for main shaft of large wind turbine generator.

BACKGROUND ART

The main shaft of wind turbine generator is one of the key parts of a wind turbine generator. Offshore wind power generation is a technology integrated with multiple disciplines as computer technology, aerodynamics, structural mechanics and material science. With the continuous improvement of wind power generation technology and the constant reduction of the costs for manufacturing generator set, the market competitiveness of offshore wind power generation will be gradually promoted with a vast potential for future development.

The main shaft is mainly used in the offshore wind turbine generator, and climatic condition, especially typhoon, is always taken as a main problem for consideration in designing the offshore wind turbine generator. Therefore, it is the most important challenge to improve the resistance to typhoon of the main shaft. By improving mechanical capacity of the main shaft, both loading capacity and impact resistance of the wind turbine generator will be enhanced, the service life of the generator will be extended, the overall generating capacity will be increased, the energy consumption can be reduced, the utilization rate of energy will be enlarged and the collection rate of wind energy in coastal areas will be amplified.

At present, the main shaft of 3.0 MW for the offshore wind turbine generator can't be processed by solid forging method, with a free forging oil press of 3150 T. The worse thing is that many enterprises that produce the main shaft less than 2.3 MW have no free forging oil presses with a larger capacity. To purchase such a new machine with a larger capacity, they have to pay more money. Therefore, it is a problem to process the main shaft of 3.0 MW for the large wind turbine generator with the existing equipment.

SUMMARY OF THE INVENTION

To solve the technical problem, the Invention provides a hollow forging process for main shaft of large wind turbine generator, especially that of above 3.0 MW. By this method, the main shaft of large wind turbine generator can be processed with the free forging oil press of 3150 T.

The technical scheme adopted to solve the technical problem in the Invention is to provide a hollow forging process for main shaft of large wind turbine generator which comprises the following steps as: the first step of cutting off the dead head and the bottom of an ingot; the second step of upsetting and punching a hole; the third step of drawing-out; and the fourth step of local upsetting, drawing-out and shaping-up. The main specifications of the forged main shaft are as follows: the outer diameter of flange is Ø2260; the steps of the forged piece are respectively Ø1150, Ø1060, Ø1000, Ø860 and Ø740; the through-hole is Ø350 and the length is 3100; using the free forging oil press of 3150 T, the main shaft with such specifications can be forged by the hollow forging method rather the solid forging method. Moreover, the material can be saved to some extent. Taking the main shaft with the specifications as an example, it may consume 33.5 T of steel ingot to forge one piece by the solid forging method, while only 30 T by the hollow forging method. Accordingly, the weight of the forged piece is lighter than that forged by the solid forging method. Meanwhile, it may reduce the working hour to roughly process the through-hole (for a solid forged piece, it shall be punched firstly and then bored to a certain size of inner hole step by step; while the inner hole size of a hollow forged piece is already 350, it only needs to process a thickness of 40 for each side to reach the due size of 430, which reduces the working hour) and thus improves the efficiency. In addition, the hollow forged main shaft is punched before being drawn out, so the fiber texture is continuous, while the fiber texture of that by the solid forging method is cut off during hole processing (in which punching is the last step) (the continuous fiber texture can improve the fatigue resistance of the main shaft and upon many years of researches on the wind turbine generator in many European and American countries, it shows that the main factor for damaging the main shaft is not the short-term load but the long-term fatigue stress). The forged piece with quenched-tempered heat treatment is light-weighted and the heating consumption is reduced. Customers are satisfied with such main shaft with low cost, high profit and low sales price than that processed by the solid forging method.

As a further improvement of the hollow forging process for main shaft of large wind turbine generator herein, in the fourth step, the forged piece is shaped up by local upsetting and drawing-out through a turnplate; the turnplate comprises a circular turnplate base and a turnplate body connected to the turnplate base; a circular hole that matches the shape of the lower end of the main shaft to be processed is arranged on the turnplate body; a hole with a certain taper is arranged in the middle of the turnplate base, which may ensure that both excircle and inner hole of the main shaft will not result in eccentricity against the same taper of core rod. Such special structure of the turnplate can keep a same center for the excircle and the inner hole.

As a further improvement of the hollow forging process for main shaft of large wind turbine generator herein, the core rod overall takes the shape of a conic cylinder; the head of the core rod is cylindrical; the fillet radius of the end of the core rod is 30-50 mm and the taper of the core rod is 1:100. The cylindrical head of the core rod is designed to have a stop function, preventing the core rod falling down further.

As a further improvement of the hollow forging process for main shaft of large wind turbine generator herein, in the third step, the process of drawing-out is conducted by a drawing-out core rod. The drawing-out core rod is overall cross-shaped; the transverse core rod body that forms the cross-shape abuts against a flange plate face of the main shaft in the process of drawing-out so as to prevent material escaping from the through-hole in the center of the main shaft. The core rod may prevent the diameter of the inner hole becoming smaller than the target size in the process of drawing-out. The core rod is remanufactured with a scrapped forged piece in order to save costs.

As a further improvement of the hollow forging process for main shaft of large wind turbine generator herein, in the second step, a plunger chip is used for punching the hole; the height of the plunger chip is greater than the depth of the punched hole after upsetting plus the necessary height allowing hanging tongs to remove the roughly processed ingot out of the plunger chip.

As a further improvement of the hollow forging process for main shaft of large wind turbine generator herein, both the plunger chip and the turnplate are made of 5CrMnMo. As a further improvement of the hollow forging process for main shaft of large wind turbine generator herein, an outer gear ring is arranged around the periphery of the turnplate body; a gear is arranged to mesh with the outer gear ring; the shaft of the gear is connected to that of a motor that drives the gear to rotate; since the gear and the outer ring are engaged to each other, when the motor operates, the turnplate body will rotate to realize rotated upsetting. The turnplate can also be driven hydraulically.

As a further improvement of the hollow forging process for main shaft of large wind turbine generator herein, the step for heating the steel ingot before the first step is to directly put a hot-charged steel ingot of above 600° C. into a furnace for heating up to 850° C.±20° C. and the temperature is maintained for 7 hours, and further reheating up to 1250° C.±10° C. and the temperature is maintained for 15 hours;

The hot-charged steel ingot refers to a steel ingot with a surface temperature of above 650° C. soon after pouring and demoulding. It is placed into a heat preserving barrel for 4-5 hours; the heat preserving barrel has a steel plate-welded outer shell, a lining of mineral wool and a cover on the top;

In the first step, the dead head and the bottom of the ingot is cut off under the forging temperature of 1200-1220° C. and the temperature is maintained for 5 hours; in the second step of upsetting, the turnplate is adopted for rotated upsetting; and the plunger chip is adopted for punching the hole; the hanging tongs are adopted for removing the roughly processed ingot out of the plunger chip after proper upsetting and punching so as to put it back into the furnace for reheating up to 1250° C.±20° C. and the temperature is maintained for 8-10 hours; in the third step of drawing-out, the ingot is drawn out into an octagon shape with marks made; the roughly processed intermediate ingot is processed; the waste part at the T-end after shaping-up of pole part is cut off under 1230-850° C. and the ingot is put back into the furnace for reheating up to 1240° C.±20° C. and the temperature is maintained for 6-7 hours; in the fourth step of local upsetting, the ingot is drawn out to shape up under the temperature of 1230-900° C., and the roughly processed intermediate ingot is vertically inserted into a gasket group consisted of several folded gaskets that is placed on a movable turnplate formed with a lower turnplate and a upper gasket; while local upsetting, the upper junction plate and the upper anvil fixed on the upsetting plate are demounted and the upsetting plate on the movable cross beam is used for upsetting by 200 mm downward; then the upper junction plate and the upper anvil are mounted to reduce the contact area of upsetting; the methods of rotated upsetting and gradual rolling are adopted to reach the required size; after upsetting, the ingot is put back into the furnace for reheating up to 1230° C.±20° C. and the temperature is maintained for 5 hours.

As a further improvement of the hollow forging process for main shaft of large wind turbine generator herein, the main shaft is made of 34CrNiMo6.

The forging equipment used in the Invention can be that with a smaller size, so that the main shaft of large wind turbine generator, especially that of above 3.0 MW can be produced with the existing equipment. Through the forging process, the material can be saved to some extent and the weight of the forged piece is lighter than that forged by the solid forging method. Meanwhile, it may reduce the working hour to roughly process the through-hole and thus improves the efficiency. In addition, the fiber texture of the hollow forged main shaft is continuous, improving the fatigue resistance of the main shaft. The forged piece with quenched-tempered heat treatment is light-weighted and the heating consumption is reduced. Customers are satisfied with such main shaft with low cost, high profit and low sales price than that processed by the solid forging method. The forging process also takes full consideration into the high requirements for multi-hole forging and ensures both excircle and inner hole will not result in eccentricity.

Marks in the figures: 1. turnplate base; 2. turnplate body; 3. circular hole; 4. hole; 5. core rod; 6. main shaft of wind turbine generator; 7. drawing-out core rod; 8. outer gear ring; 9. gear.

DETAILED DESCRIPTION OF THE PREFERRED EMBODIMENTS

The embodiments of the Invention will be further described in combination with the drawings as follows to make the technical features, purpose, and effectiveness of the Invention clearer.

Figure 1:
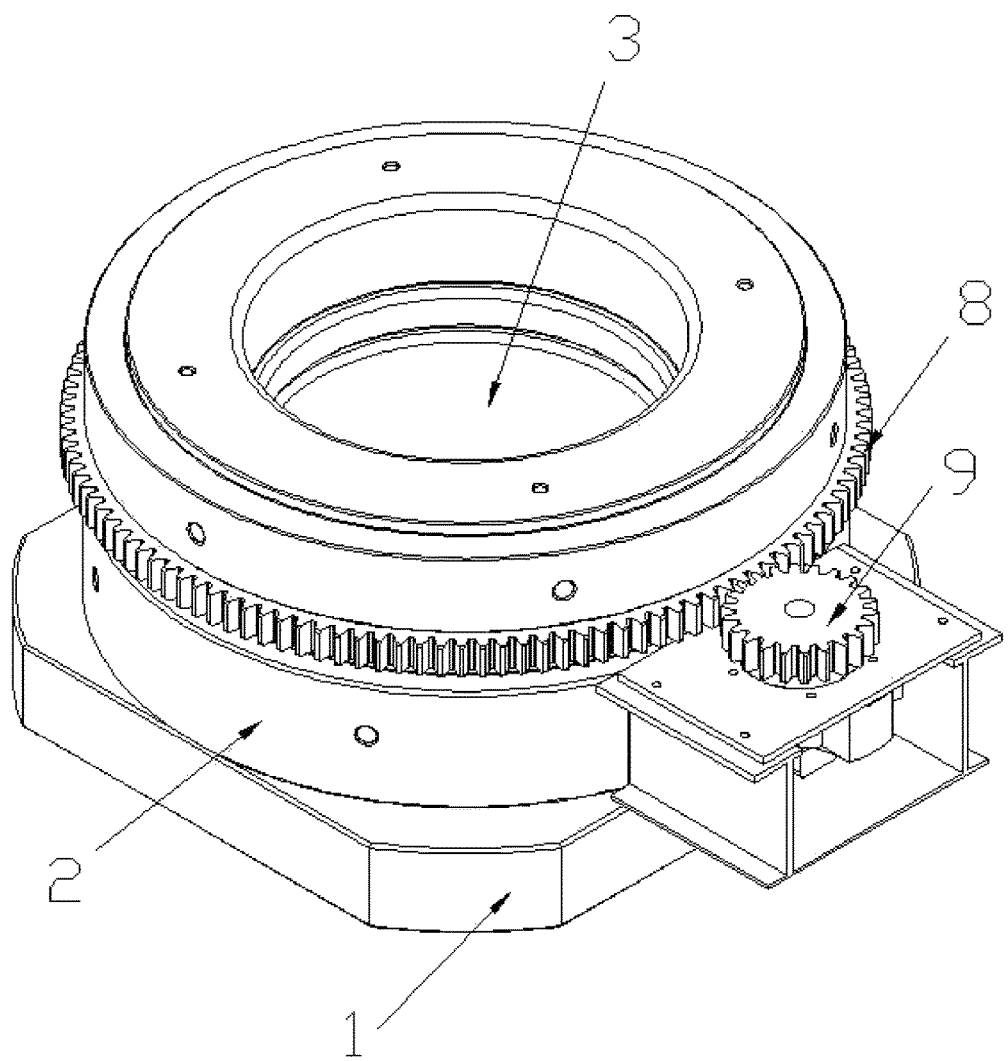
FIG. 1 is a structure diagram of the turnplate involved in the fourth step of the hollow forging process for main shaft of large wind turbine generator in the Invention.
Figure 2:
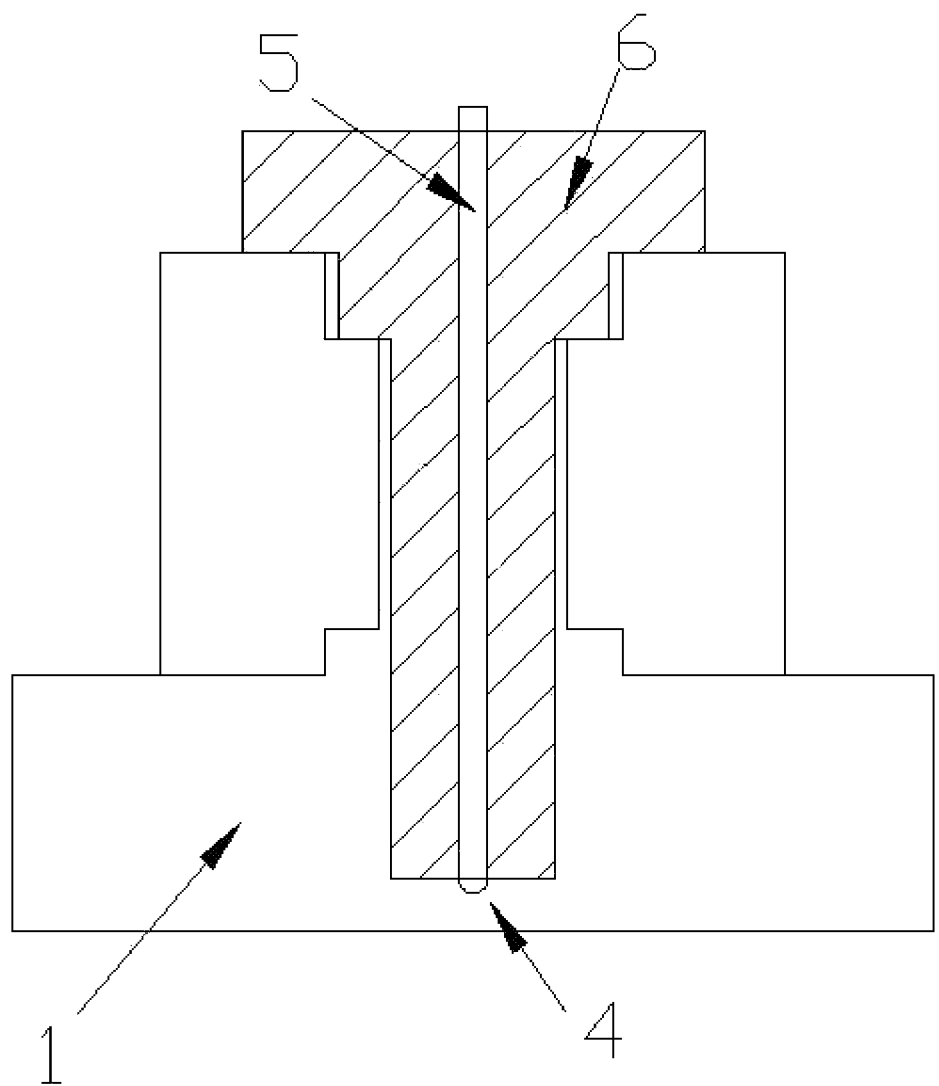
FIG. 2 is a sectional view of the state diagram of upsetting main shaft in FIG. 1.
Figure 3:
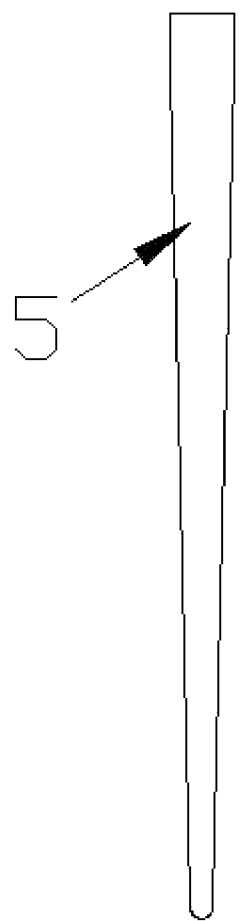
FIG. 3 is a structure diagram of the core rod in FIG. 2.
Figure 4:
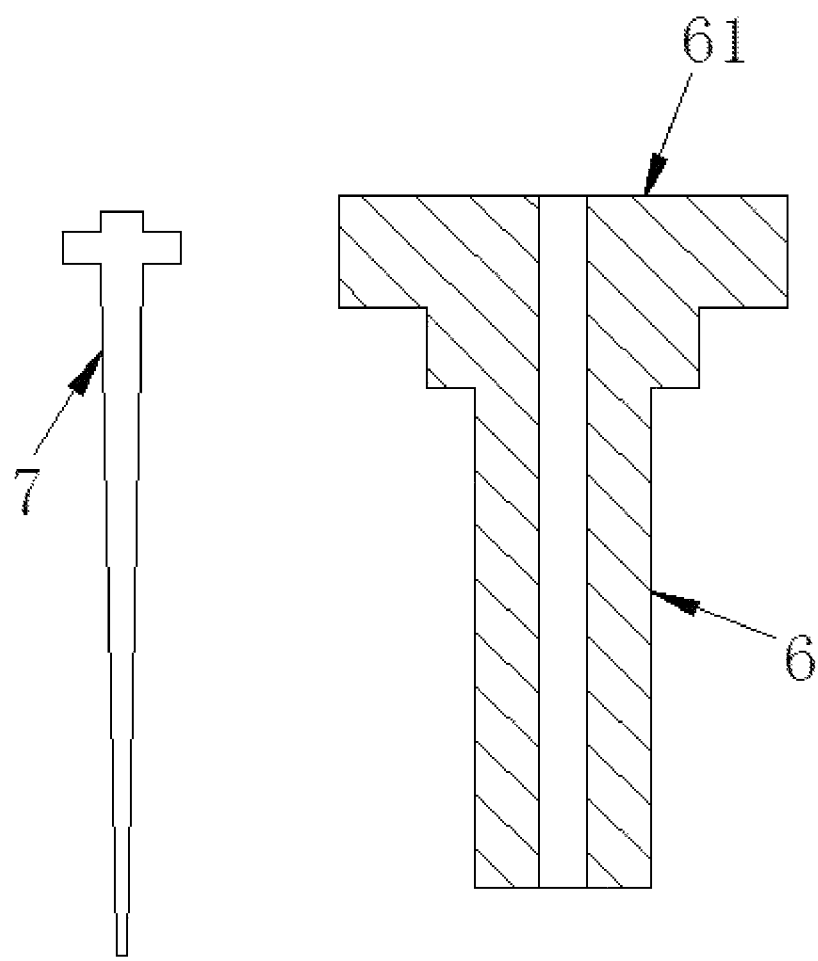
FIG. 4 is a state diagram of the drawing-out core rod not inserted into the through-hole in the center of the shaft in the third step.

A hollow forging process for main shaft of large wind turbine generator comprises the following steps as: the first step of cutting off the dead head and the bottom of an ingot; the second step of upsetting and punching a hole; the third step of drawing-out; and the fourth step of local upsetting, drawing-out and shaping-up. In the fourth step, the forged piece is shaped up by local upsetting and drawing-out through a turnplate; as shown in FIGS. 1-4, the turnplate comprises a circular turnplate base 1 and a turnplate body 2 connected to the turnplate base 1; a circular hole 3 that matches the shape of the lower end of the main shaft 6 to be processed is arranged on the turnplate body 2; a hole 4 with a certain taper is arranged in the middle of the turnplate base 1, which may ensure both excircle and inner hole of the main shaft 6 will not result in eccentricity in combination with a core rod 5 of the same taper. The overall core rod 5 is a conic cylinder; the head of the core rod 5 is cylindrical; the fillet radius of the end of the core rod 5 is 30-50 mm and the taper of the core rod 5 is 1:100. In the third step, the process of drawing-out is conducted with a drawing-out core rod 7; the drawing-out core rod 7 is overall cross-shaped; the transverse core rod body that forms the cross-shape abuts against the flange plate face 61 of the main shaft 6 during drawing-out so as to prevent material escaping from through-hole in the center of the main shaft 6. In the second step, a plunger chip is used for punching the hole; the height of the plunger chip is greater than the depth of the punched hole after upsetting plus the necessary height allowing hanging tongs to remove the roughly processed ingot out of the plunger chip. Both the plunger chip and the turnplate are made of 5CrMnMo. An outer gear ring 8 is arranged around the periphery of the turnplate body 2; a gear 9 is arranged to mesh with the outer gear ring 8; the shaft of the gear is connected to that of a motor shaft that drives the gear 9 to rotate; since the gear 9 and the outer ring 8 are engaged to each other, when the motor operates, the turnplate body 2 will rotate to realize rotated upsetting. The step for heating the steel ingot before the first step is to directly put a hot-charged steel ingot of above 600° C. into a furnace for heating up to 850° C.±20° C. and the temperature is maintained for 7 hours, and further reheating up to 1250° C.±10° C. and the temperature is maintained for 15 hours;

The hot-charged steel ingot refers to a steel ingot with a surface temperature of above 650° C. soon after pouring and demoulding. It is placed into a heat preserving barrel for 4-5 hours; the heat preserving barrel has a steel plate-welded outer shell, a lining of mineral wool and a cover on the top;

In the first step, the dead head and the bottom of the ingot are cut off under the forging temperature of 1200-1220° C. and the temperature is maintained for 5 hours; in the second step, the turnplate is adopted for rotated upsetting; and the plunger chip is adopted for hole punching the hole; the hanging tongs are adopted for removing the roughly processed ingot out of the plunger chip after proper upsetting and punching so as to put it back into the furnace for reheating up to 1250° C.±20° C. and the temperature is maintained for 8-10 hours; in the third step of drawing-out, the ingot is drawn out into an octagon shape with marks made; the roughly processed intermediate ingot is processed; the waste part at the T-end after shaping-up of pole part is cut off under 1230-850° C. and the ingot is put back into the furnace for reheating up to 1240° C.±20° C. and the temperature is maintained for 6-7 hours; in the fourth step of local upsetting, the ingot is drawn out to shape up under the temperature of 1230-900° C., and the roughly processed intermediate ingot is vertically inserted into a gasket group consisted of several folded gaskets that is placed on a movable turnplate formed with a lower turnplate and a upper gasket; while local upsetting, the upper junction plate and the upper anvil fixed on the upsetting plate are demounted and the upsetting plate on the movable cross beam is used for upsetting down by 200 mm downward; then the upper junction plate and the upper anvil are mounted to reduce the contact area of upsetting; the methods of rotated upsetting and gradual rolling are adopted to reach the required size; after upsetting, the ingot is put back into the furnace for reheating up to 1230° C.±20° C. and the temperature is maintained for 5 hours. The main shaft is made of 34CrNiMo6.

The above is only a further detailed description for the Invention in combination with the specific preferred technical schemes and the embodiments of the Invention are not limited to it. For a person skilled in the art, the simple deductions or substitutions carried out under the premise of not departing from the concept of the Invention will fall within the protection scope of the Invention.

The invention claimed is:

1. A hollow forging process for main shaft of wind turbine generator, comprising the following steps:

a first step of cutting off the dead head and the bottom of an ingot; a second step of upsetting and punching a hole; a third step of drawing-out; and a fourth step of local upsetting, drawing-out and shaping-up;

wherein, in the fourth step, the forged piece is shaped up by local upsetting and drawing-out through a turnplate; the turnplate comprises a circular turnplate base and a turnplate body connected to the turnplate base; a circular hole that matches the shape of the lower end of the main shaft to be processed is arranged on the turnplate body; a hole with a taper is arranged in the middle of the turnplate base, which ensures both excircle and inner hole of the main shaft will not result in eccentricity in combination with a core rod of the taper; the core rod is a conic cylinder; the head of the core rod is cylindrical; the fillet radius of the end of the core rod is 30-50 mm and the taper of the core rod is 1:100.

2. The hollow forging process for main shaft of wind turbine generator according to claim 1, wherein, in the third step, the process of drawing-out is conducted by a drawing-out core rod; the drawing-out core rod is overall cross-shaped; the transverse core rod body that forms the cross-shape abuts against a flange plate face of the main shaft during drawing-out so as to prevent material escaping from a through-hole in the center of the main shaft.

3. The hollow forging process for main shaft of wind turbine generator according to claim 1, wherein, in the second step, a plunger chip is used for punching the hole; the height of the plunger chip is greater than the depth of the punched hole after upsetting plus the necessary height allowing hanging tongs to remove a roughly processed ingot out of the plunger chip.

4. The hollow forging process for main shaft of wind turbine generator according to claim 3, wherein, both the plunger chip and the turnplate are made of 5CrMnMo.

5. The hollow forging process for main shaft of wind turbine generator according to claim 1, wherein, an outer gear ring is arranged around the periphery of the turnplate body; a gear is arranged to mesh with the outer gear ring; the shaft of the gear is connected to that of a motor that drives the gear to rotate; since the gear and the outer ring are engaged to each other, when the motor operates, the turnplate body will rotate to realize rotated upsetting.

6. The hollow forging process for main shaft of wind turbine generator according to claim 1, further comprises a step of heating the ingot before the first step by directly putting a hot-charged steel ingot of above 600° C. into a furnace for heating up to 850° C.±20° C. and the temperature is maintained for 7 hours, and further reheating up to 1250° C.±10° C. and the temperature is maintained for 15 hours;

in the first step, the dead head and the bottom of the ingot is cut off under a forging temperature of 1200-1220° C. and the forging temperature is maintained for 5 hours;

in the second step of upsetting, the turnplate is adopted for rotated upsetting; and a plunger chip is adopted for punching the hole; hanging tongs are adopted for removing a roughly processed ingot out of the plunger chip after proper upsetting and punching so as to put it back into the furnace for reheating up to 1250° C.±20° C. and the temperature is maintained for 8-10 hours;

in the third step of drawing-out, the ingot is drawn out into an octagon shape with marks made; a roughly processed intermediate ingot is processed; the ingot is put back into the furnace for reheating up to 1240° C.±20° C. and the temperature is maintained for 6-7 hours;

in the fourth step of local upsetting, the ingot is drawn out to shape up under the temperature of 1230-900° C., and the roughly processed intermediate ingot is vertically inserted into a gasket group consisted of several folded gaskets that is placed on a movable turnplate formed with a lower tumplate and a upper gasket; while local upsetting, an upper junction plate and an upper anvil fixed on the upsetting plate are demounted and the upsetting plate on a movable cross beam is used for upsetting by 200 mm downward; then the upper junction plate and the upper anvil are mounted to reduce the contact area of upsetting; the methods of rotated upsetting and gradual rolling are adopted to reach the required size; after upsetting, the ingot is put back into the furnace for reheating up to 1230° C.±20° C. and the temperature is maintained for 5 hours.

7. The hollow forging process for main shaft of large wind turbine generator according to claim 1, wherein, the main shaft is made of 34CrNiMo6.

8. The hollow forging process for main shaft of wind turbine generator according to claim 2, wherein, the main shaft is made of 34CrNiMo6.

9. The hollow forging process for main shaft of wind turbine generator according to claim 6, wherein, the hot-charged steel ingot is a steel ingot with a surface temperature of above 650° C. soon after pouring and demoulding, and the hot-charged steel ingot is placed into a heat preserving barrel for 4-5 hours; the heat preserving barrel has a steel plate-welded outer shell, a lining of mineral wool and a cover on the top.

* * * * *